(12) United States Patent
Takahashi et al.

(10) Patent No.: US 9,002,324 B2
(45) Date of Patent: Apr. 7, 2015

(54) MOBILE COMMUNICATION METHOD AND MOBILE MANAGEMENT NODE

(75) Inventors: Hideaki Takahashi, Tokyo (JP); Yasufumi Morioka, Tokyo (JP); Alf Zugenmaier, Munich (DE)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/009,169

(22) PCT Filed: Mar. 28, 2012

(86) PCT No.: PCT/JP2012/058134
§ 371 (c)(1),
(2), (4) Date: Dec. 17, 2013

(87) PCT Pub. No.: WO2012/137643
PCT Pub. Date: Oct. 11, 2012

(65) Prior Publication Data
US 2014/0094145 A1    Apr. 3, 2014

(30) Foreign Application Priority Data
Apr. 1, 2011    (JP) .............................. P2011-082240

(51) Int. Cl.
*H04M 1/66*    (2006.01)
*H04W 12/04*    (2009.01)
*H04W 12/06*    (2009.01)
(Continued)

(52) U.S. Cl.
CPC .............. *H04W 12/04* (2013.01); *H04W 12/06* (2013.01); *H04W 48/18* (2013.01); *H04L 9/0838* (2013.01); *H04W 48/17* (2013.01); *H04L 63/0853* (2013.01); *H04W 84/047* (2013.01); *H04L 9/0844* (2013.01)

(58) Field of Classification Search
CPC ..... H04W 12/00; H04W 12/06; H04W 12/08; H04W 4/02; H04W 12/02; H04W 12/12; H04W 88/08; H04W 4/00
USPC .......................................... 455/11.1, 410, 411
See application file for complete search history.

(56) References Cited

U.S. PATENT DOCUMENTS

2011/0185397 A1 *   7/2011   Escott et al. ...................... 726/3

FOREIGN PATENT DOCUMENTS

JP    2011-023873 A    2/2011

OTHER PUBLICATIONS

International Search Report issued in PCT/JP2012/058134 mailed on May 22, 2012 (2 pages).

(Continued)

*Primary Examiner* — Khai M Nguyen
*Assistant Examiner* — Dung Lam
(74) *Attorney, Agent, or Firm* — Osha Liang LLP

(57) ABSTRACT

In an attach process executed as a relay node RN, the wasteful use of a resource is avoided. A mobile communication method according to the present invention includes a step of transmitting, by a radio base station DeNB, "(S1) Initial UE message" indicating the attach process executed as the relay node RN to a mobile management node MME in response to "Attach Request (RN)" received from the relay node RN having a secure channel established between the relay node RN and USIM-RN, a step of starting, by the mobile management node MME, "EPS-AKA" between the relay node RN and the USIM-RN in response to the "(S1) Initial UE message", and a step of failing in the "EPS-AKA" when it is determined that the USIM-RN cannot be used for the attach process executed as the relay node RN.

2 Claims, 3 Drawing Sheets

(51) Int. Cl.
*H04W 48/18* (2009.01)
*H04L 9/08* (2006.01)
*H04W 48/00* (2009.01)
*H04L 29/06* (2006.01)
*H04W 84/04* (2009.01)

(56) References Cited

OTHER PUBLICATIONS

3GPP TS 36.300 V10.2.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)"; Dec. 2010 (35 pages).

3GPP TS 33.401 V9.6.0; "3rd Generation Partnership Project; Technical Specification Group Services and System Aspects; 3GPP System Architecture Evolution (SAE); Security architecture (Release 9)"; Dec. 2010 (105 pages).

3GPP TS 36.300 V9.7.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)"; Mar. 2011 (173 pages).

Office Action in counterpart Korean Patent Application No. 10-2013-7028839, mailed Jul. 23, 2014 (7 pages).

Patent Examination Report No. 1 dated Oct. 15, 2014, in corresponding Australian Patent Application No. 2012239436 (3 pages).

Office Action issued in counterpart Chinese Patent Application No. 201280017310.3, mailed Apr. 28, 2014 (9 pages).

NTT DOCOMO, Inc., et al., "RAN3 stage-3 work for relay node security", 3GPP TSG-RAN WG3 #71 R3-110791; Taipei, Taiwan; Feb. 21-25, 2011 (2 pages).

Office Action in corresponding Korean Patent Application No. 10-2013-7028839 dated Feb. 28, 2014, with translation (9 pages).

3GPP TR 33.816 V10.0.0; "3rd Generation Partnership Project; Technical Specification Group Services and System Aspects; Feasibility study on LTE relay node security (Release 10)"; Mar. 2011 (94 pages).

* cited by examiner

MOBILE COMMUNICATION METHOD AND MOBILE MANAGEMENT NODE

TECHNICAL FIELD

The present invention relates to a mobile communication method and a mobile management node.

BACKGROUND ART

In an LTE (Long Term Evolution)-Advanced scheme, it is possible to use a relay node RN connectable through a Un interface, for a radio base station DeNB (Donor eNB).

It is defined that in an attach process of the relay node RN, the relay node RN performs an attach process (Phase-1) similar to that executed by a mobile station UE and then performs an attach process (Phase-2) executed as the relay node RN (Non Patent Literatures 1 and 2).

Hereinafter, with reference to FIG. 4, the attach process executed as the relay node RN will be simply described.

As illustrated in FIG. 4, in step S2001, when "USIM-RN (Universal Subscriber Identity Module-RN, a subscriber identification module for a relay node)" is not active, the relay node RN sets the USIM-RN to active and restores (or reconfigures) a secure channel between the relay node RN and the USIM-RN.

In addition, the USIM-RN can be accessed only through the secure channel.

In such a case, the relay node RN invalidates "EPS security context" in the USIM-RN.

In step S2002, the relay node RN transmits, to a radio base station DeNB, "Attach Request (RN) (an attach request signal)" for requesting an attach process executed as the relay node RN.

Furthermore, the relay node RN transmits "Attach Request" including IMSI (International Mobile Subscriber Identity) or GUTI (Global Unique Temporary Identifier) related to the USIM-RN.

In step S2003, the radio base station DeNB transmits "(S1) Initial UE message (an initial signal)" to a mobile management node MME (Mobility Management Entity).

In response to the "(S1) Initial UE message", the mobile management node MME performs "EPS-AKA (Evolved Packet System-Authentication and Key Agreement, an authentication and key agreement procedure)" between the relay node RN and the USIM-RN in step S2004, and sets NAS (Non Access Stratum) security between the mobile management node MME and the relay node RN in step S2005.

Furthermore, the relay node RN uses only a key received from the USIM-RN through the secure channel.

In step S2006, the mobile management node MME determines whether the USIM-RN can be used for the attach process executed as the relay node RN on the basis of subscriber data (subscription data) acquired from a subscriber management server HSS (Home Subscriber Server.)

In step S2007, the mobile management node MME transmits "(S1) Initial Context Setup Request" including a result of the determination to the radio base station DeNB.

When the result of the determination indicates that the USIM-RN can be used for the attach process executed as the relay node RN, the radio base station DeNB sets AS (Access Stratum) security in step S2009 and sets AS security for the relay node RN for S1/X2 DRB (Data Radio Bearer) in step S2010.

When the result of the determination indicates that the USIM-RN cannot be used for the attach process executed as the relay node RN, the radio base station DeNB rejects the attach process of the relay node RN.

CITATION LIST

Non Patent Literature

[NPL 1] 3GPP TS33.401
[NPL 2] 3GPP TS36.300

SUMMARY OF THE INVENTION

However, in the existing LTE-Advanced scheme, even when the USIM-RN cannot be used for the attach process executed as the relay node RN (that is, the attach process executed as the relay node RN is rejected) as described above, since NAS security is always set between the mobile management node MME and the relay node RN, there is a problem that the "(S1) Initial Context Setup Request" is wastefully transmitted.

Therefore, the present invention has been achieved in view of the above-described problem, and an object thereof is to provide a mobile communication method and a mobile management node with which it is possible to avoid the wasteful use of a resource in an attach process executed as a relay node RN.

A first characteristic of the present invention is summarized in that a mobile communication method includes: a step of transmitting, by a relay node having a secure channel established between the relay node and a subscriber identification module for a relay node, an attach request signal for requesting an attach process executed as the relay node to a radio base station; a step of transmitting, by the radio base station, an initial signal indicating the attach process executed as the relay node to a mobile management node in response to the attach request signal; a step of starting, by the mobile management node, an authentication and key agreement procedure between the relay node and a general-purpose subscriber identification module in response to the initial signal; a step of determining, by the mobile management node, whether the subscriber identification module for a relay node can be used for the attach process executed as the relay node on the basis of subscriber data acquired from a subscriber management server; a step of setting NAS security between the mobile management node and the relay node when it is determined that the subscriber identification module for a relay node can be used for the attach process executed as the relay node; and a step of failing in the authentication and key agreement procedure when it is determined that the subscriber identification module for a relay node cannot be used for the attach process executed as the relay node.

A second characteristic of the present invention is summarized in that a mobile management node includes: a reception unit that receives an initial signal indicating an attach process executed as a relay node from a radio base station, in the attach process of the relay node having a secure channel established between the relay node and a subscriber identification module for a relay node; a communication unit that starts an authentication and key agreement procedure between the relay node and a general-purpose subscriber identification module in response to the initial signal; and a determination unit that determines whether the subscriber identification module for a relay node can be used for the attach process executed as the relay node on the basis of subscriber data acquired from a subscriber management server, wherein, when the determination unit determines that the subscriber identification module for a relay node can be used for the attach process executed as the relay node, the communication unit is configured to set NAS security between the mobile management node and the relay node, and when the determination unit determines that the subscriber identification module for a relay node cannot be used for the attach process executed as the relay node, the communication unit is configured to end the authentication and key agreement procedure without success in the authentication and key agreement procedure.

DESCRIPTION OF EMBODIMENTS (Mobile Communication System According to First Embodiment of the Present Invention)

A mobile communication system according to a first embodiment of the present invention will be described with reference to FIGS. 1 to 3.

Figure 1:
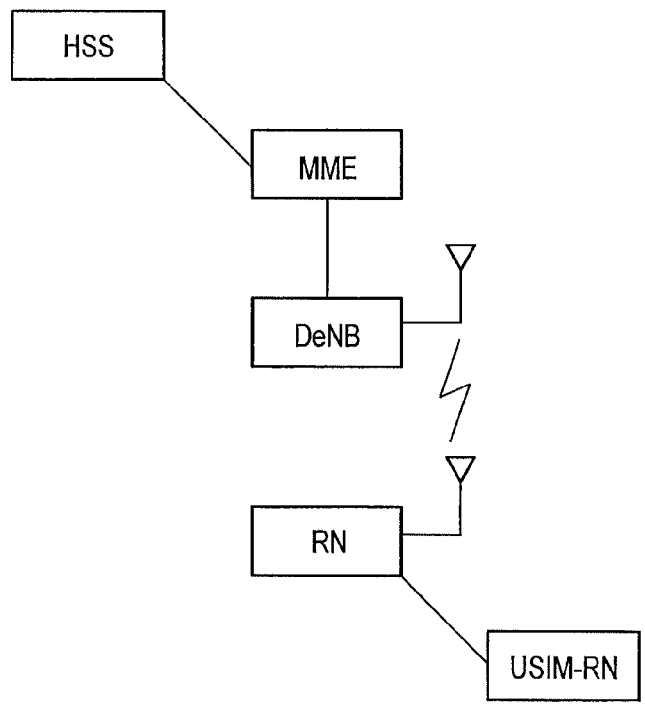
FIG. 1 is a diagram illustrating the entire configuration of a mobile communication system according to a first embodiment of the present invention.

The mobile communication system according to the present embodiment is an LTE-Advanced mobile communication system, and includes a subscriber management server HSS, a mobile management node MME, a radio base station DeNB, and a relay node RN as illustrated in FIG. 1.

Furthermore, USIM-RN is configured to be capable of connecting to the relay node RN.

The relay node RN is configured to be capable of setting so that the connected USIM-RN is active and a secure channel is established between the relay node RN and the USIM-RN.

Figure 2:
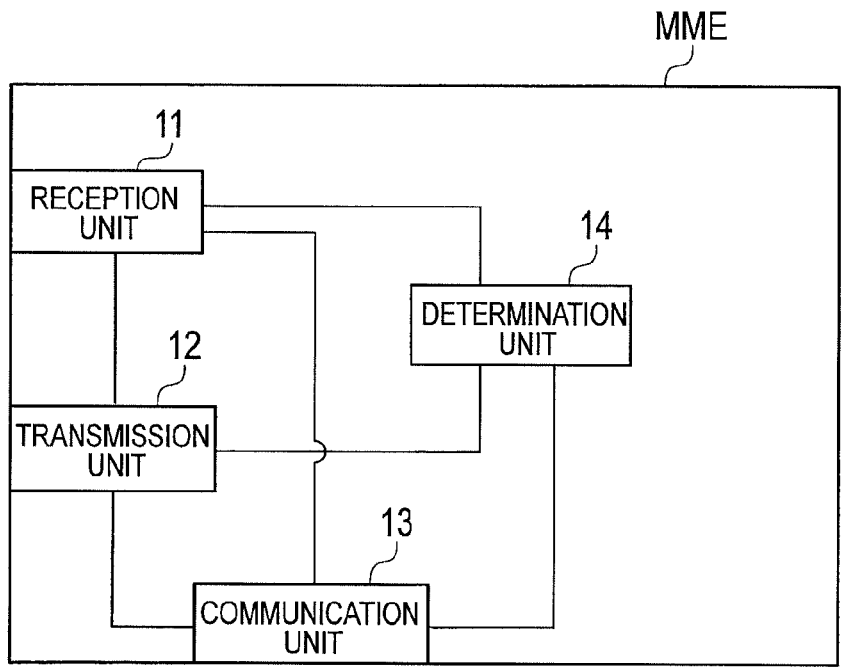
FIG. 2 is a functional block diagram of a mobile management node according to the first embodiment of the present invention.

As illustrated in FIG. 2, the mobile management node MME includes a reception unit 11, a transmission unit 12, a communication unit 13, and a determination unit 14.

The reception unit 11 is configured to receive various types of information from the radio base station DeNB and the subscriber management server HSS.

For example, the reception unit 11 is configured to receive "(S1) Initial UE message" from the radio base station DeNB or subscriber data related to the relay node RN from the subscriber management server HSS.

The transmission unit 12 is configured to transmit various types of information to the radio base station DeNB.

For example, the transmission unit 12 is configured to transmit "(S1) Initial Context Setup Request" to the radio base station DeNB.

The communication unit 13 is configured to perform "EPA-AKA" between the relay node RN and the USIM-RN, or to set NAS security between the mobile management node MME and the relay node RN.

The determination unit 14 is configured to determine whether the USIM-RN can be used for an attach process executed as the relay node RN on the basis of the subscriber data acquired from the subscriber management server HSS.

Furthermore, when the determination unit 14 determines that the USIM-RN can be used for an attach process executed as the relay node RN, the communication unit 13 is configured to set the NAS security between the mobile management node MME and the relay node.

Meanwhile, when the determination unit 14 determines that the USIM-RN cannot be used for an attach process executed as the relay node RN, the communication unit 13 is configured to end the "EPS-AKA" without success in the "EPS-AKA".

An example of an operation of the mobile communication system according to the first embodiment of the present invention will be described below with reference to FIG. 3.

Figure 3:
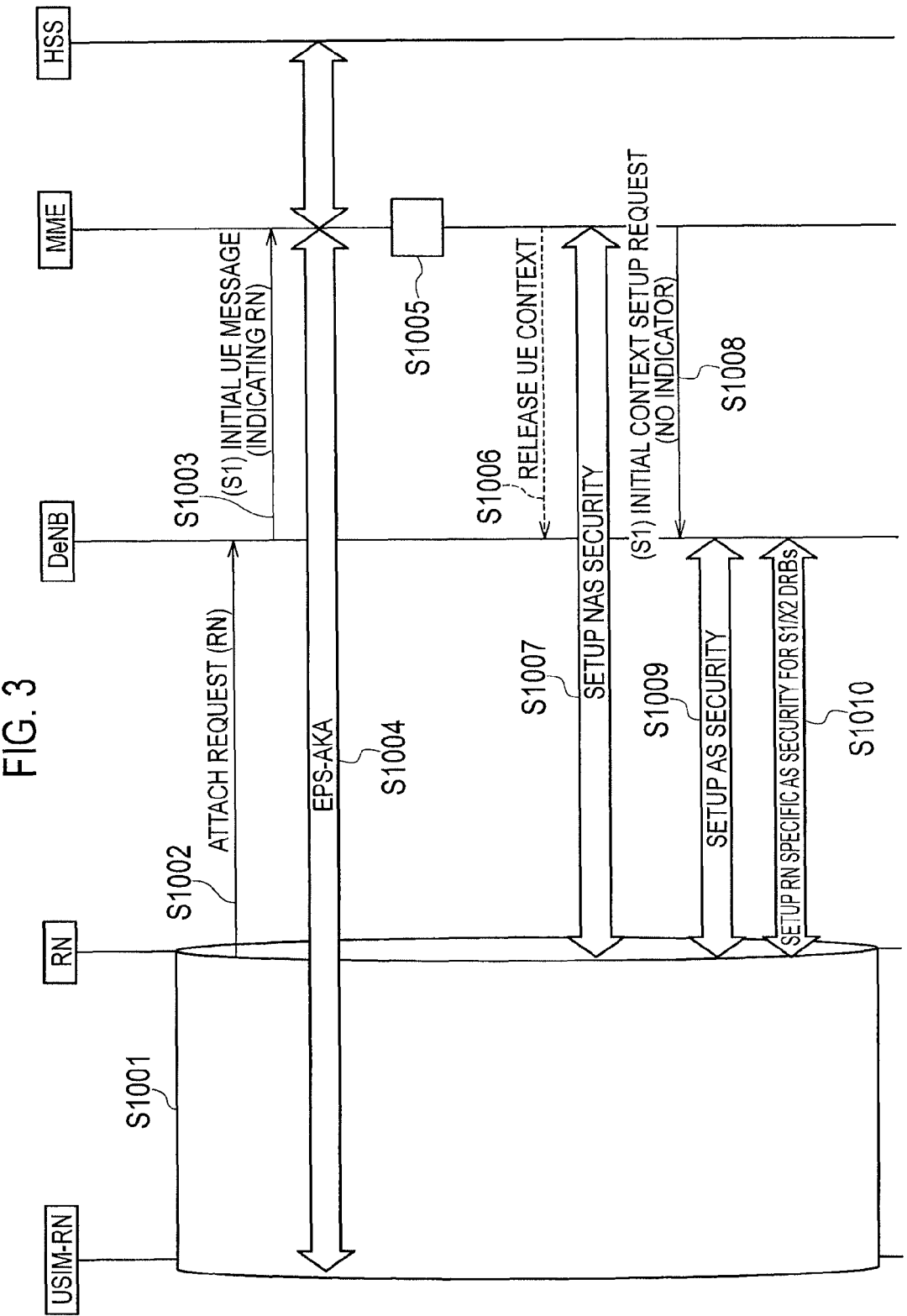
FIG. 3 is a sequence diagram showing an operation of the mobile communication system according to the first embodiment of the present invention.
Figure 4:
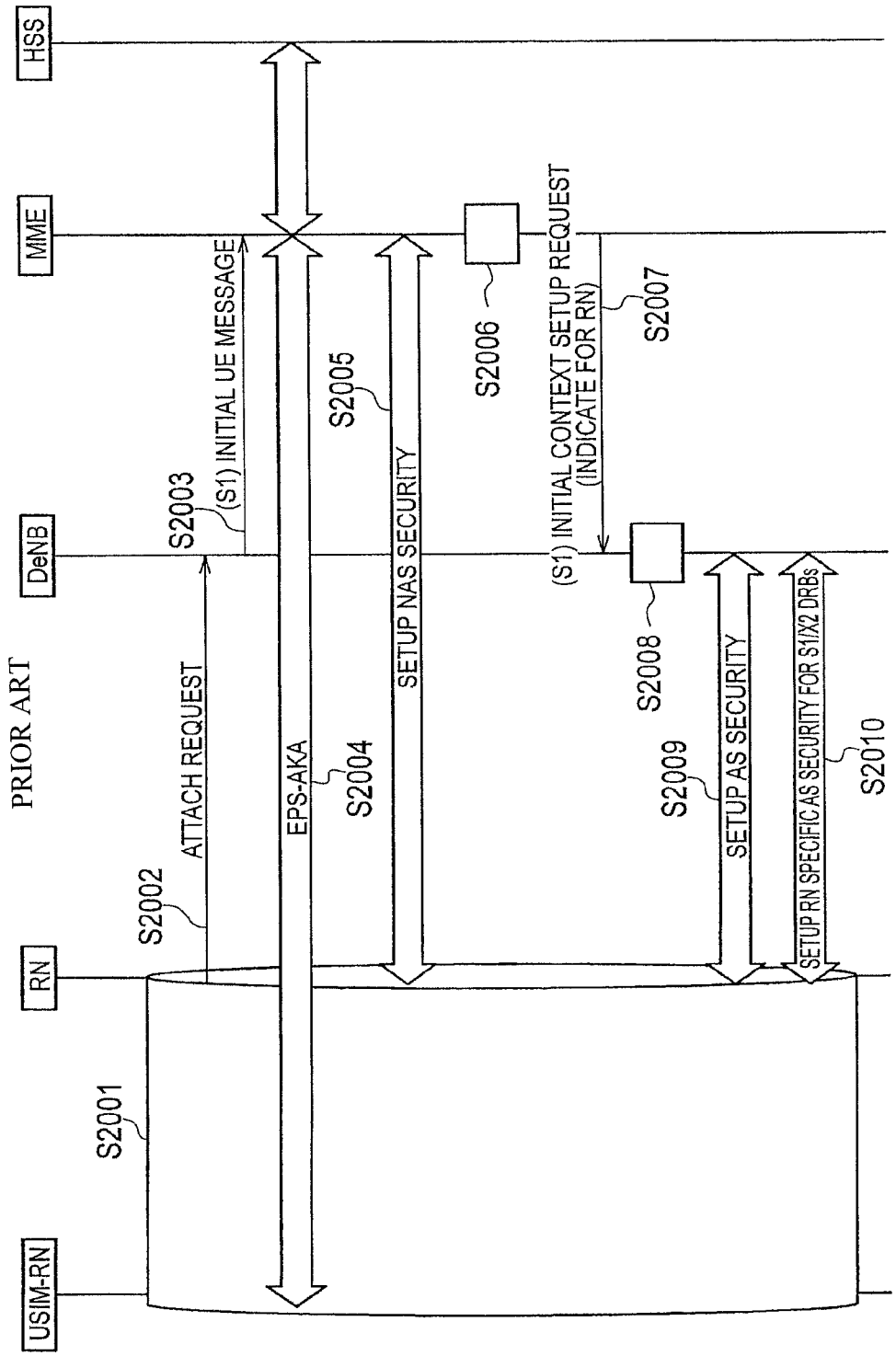
FIG. 4 is a sequence diagram illustrating an operation of an existing mobile communication system.

As illustrated in FIG. 3, in step S1001, when the USIM-RN is not active, the relay node RN sets the USIM-RN to active and restores (or reconfigures) a secure channel between the relay node RN and the USIM-RN.

In such a case, the relay node RN invalidates "EPS security context" in the USIM-RN.

In step S1002, the relay node RN transmits, to the radio base station DeNB, "Attach Request (RN)" for requesting an attach process executed as the relay node RN.

Furthermore, the relay node RN transmits "Attach Request" including IMSI or GUTI related to the USIM-RN.

In step S1003, the radio base station DeNB transmits "(S1) Initial UE message" to the mobile management node MME, wherein the "(S1) Initial UE message" indicates the attach process executed as the relay node RN.

In step S1004, in response to the "(S1) Initial UE message", the mobile management node MME starts "EPS-AKA" between the relay node RN and the USIM-RN.

In step S1005, the mobile management node MME determines whether the USIM-RN can be used for the attach process executed as the relay node RN on the basis of subscriber data acquired from the subscriber management server HSS.

When it is determined that the USIM-RN can be used for the attach process executed as the relay node RN, the mobile management node MME transmits "Release UE Context" to the radio base station DeNB in step S1006, and sets NAS security between the mobile management node MME and the relay node RN in step S1007.

Furthermore, the relay node RN uses only a key received from the USIM-RN through the secure channel.

In step S1008, the mobile management node MME transmits "(S1) Initial Context Setup Request" to the radio base station DeNB. The "(S1) Initial Context Setup Request" does not include a result of the determination in step S105.

The radio base station DeNB sets AS (Access Stratum) security in step S1009, and sets AS security for the relay node RN for S1/X2 DRB in step S1010.

Meanwhile, when it is determined that the USIM-RN cannot be used for the attach process executed as the relay node RN, the mobile management node MME fails in the "EPS-AKA" (that is, ends the "EPS-AKA" without success in the "EPS-AKA").

In accordance with the mobile communication system according to the present embodiment, when the USIM-RN cannot be used for the attach process executed as the relay node RN, the attach process executed as the relay node RN is failed without setting the NAS security between the mobile management node MME and the relay node RN, so that it is possible to avoid the wasteful use of a resource, for example, wasteful transmission of the "(S1) Initial Context Setup Request".

The characteristics of the present embodiment as described above may be expressed as follows.

A first characteristic of the present embodiment is summarized in that a mobile communication method includes: a step of transmitting, by a relay node RN having a secure channel established between the relay node RN and USIM-RN (a subscriber identification module for a relay node), "Attach Request (RN) (an attach request signal)" for requesting attachment as the relay node RN to a radio base station DeNB; a step of transmitting, by the radio base station DeNB, "(S1) Initial UE message (an initial signal)" indicating the attach process executed as the relay node RN to a mobile management node MME in response to the "Attach Request (RN)"; a step of starting, by the mobile management node MME, "EPA-AKA (an authentication and key agreement procedure)" between the relay node RN and the USIM-RN in response to the "(S1) Initial UE message"; a step of determining, by the mobile management node MME, whether the USIM-RN can be used for the attach process executed as the relay node RN on the basis of subscriber data acquired from a subscriber management server HSS; a step of setting NAS security between the mobile management node MME and the relay node RN when it is determined that the USIM-RN can be used for the attach process executed as the relay node RN; and a step of failing in the "EPS-AKA" when it is determined that the USIM-RN cannot be used for the attach process executed as the relay node RN.

A second characteristic of the present embodiment is summarized in that a mobile management node MME includes: a reception unit 11 that receives "(S1) Initial UE message" indicating an attach process executed as a relay node RN from a radio base station DeNB in the attach process of the relay node RN having a secure channel established between the relay node RN and USIM-RN; a communication unit 13 that starts "EPS-AKA" between the relay node RN and the USIM-RN in response to the "(S1) Initial UE message"; and a determination unit 14 that determines whether the USIM-RN can be used for the attach process executed as the relay node RN on the basis of subscriber data acquired from a subscriber management server HSS, wherein, when the determination unit 14 determines that the USIM-RN can be used for the attach process executed as the relay node RN, the communication unit 13 is configured to set NAS security between the mobile management node MME and the relay node RN, and when the determination unit 14 determines that the USIM-RN cannot be used for the attach process executed as the relay node RN, the communication unit 13 is configured to end the "EPS-AKA" without success in the "EPS-AKA".

Note that the operation of the mobile management node MME, the radio base station DeNB, the relay node RN, or the subscriber management server HSS may be performed by hardware, a software module performed by a processor, or a combination thereof.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can write and read information into and from the storage medium. Such a storage medium may also be accumulated in the processor. Such a storage medium and processor may be arranged in an ASIC. The ASIC may be arranged in the mobile management node MME, the radio base station DeNB, the relay node RN, or the subscriber management server HSS. Furthermore, such a storage medium and processor may be arranged in the mobile management node MME, the radio base station DeNB, the relay node RN, or the subscriber management server HSS as discrete components.

Thus, the present invention has been explained in detail by using the above-described embodiments; however, it is obvious that for persons skilled in the art, the present invention is not limited to the embodiments explained herein. The present invention can be implemented as a corrected and modified mode without departing the gist and the scope of the present invention defined by the claims. Therefore, the description of the specification is intended for explaining the example only and does not impose any limited meaning to the present invention.

In addition, the entire content of Japanese Patent Application No. 2011-082240 (filed on Apr. 1, 2011) is incorporated in the present specification by reference.

INDUSTRIAL APPLICABILITY

As described above, according to the present invention, it is possible to provide a mobile communication method and a mobile management node, by which it is possible to avoid the wasteful use of a resource in an attach process executed as a relay node RN.

REFERENCE SIGNS LIST

RN . . . Relay node
HSS . . . subscriber management server
MME . . . mobile management node
11 . . . Reception unit
12 . . . Transmission unit
13 . . . Communication unit
14 . . . Determination unit

The invention claimed is:
1. A mobile communication method comprising:
a step of transmitting, by a relay node having a secure channel established between the relay node and a subscriber identification module for a relay node, an attach request signal for requesting an attach process executed as the relay node to a radio base station;
a step of transmitting, by the radio base station, an initial signal indicating the attach process executed as the relay node to a mobile management node in response to the attach request signal;
a step of starting, by the mobile management node, an authentication and key agreement procedure between the relay node and the subscriber identification module for a relay node in response to the initial signal;
a step of determining, by the mobile management node, whether the subscriber identification module for a relay node can be used for the attach process executed as the relay node on the basis of subscriber data acquired from a subscriber management server;
a step of setting NAS security between the mobile management node and the relay node when it is determined that the subscriber identification module for a relay node can be used for the attach process executed as the relay node; and
a step of failing in the authentication and key agreement procedure when it is determined that the subscriber identification module for a relay node cannot be used for the attach process executed as the relay node.
2. A mobile management node comprising:
a reception unit that receives an initial signal indicating an attach process executed as a relay node from a radio base station, in the attach process of the relay node having a secure channel established between the relay node and a subscriber identification module for a relay node;

a communication unit that starts an authentication and key agreement procedure between the relay node and the subscriber identification module for a relay node in response to the initial signal; and a determination unit that determines whether the subscriber identification module for a relay node can be used for the attach process executed as the relay node on the basis of subscriber data acquired from a subscriber management server, wherein when the determination unit determines that the subscriber identification module for a relay node can be used for the attach process executed as the relay node, the communication unit is configured to set NAS security between the mobile management node and the relay node, and wherein when the determination unit determines that the subscriber identification module for a relay node cannot be used for the attach process executed as the relay node, the communication unit is configured to end the authentication and key agreement procedure without success in the authentication and key agreement procedure.

* * * * *